United States Patent [19] [11] 3,825,901

Golnek, Sr. et al. [45] July 23, 1974

[54] INTEGRATED DIAGNOSTIC TOOL

[75] Inventors: Bryan R. Golnek, Sr., Hyde Park; Ronald M. Walton, Poughkeepsie, both of N.Y.

[73] Assignee: International Business Machines Corporation, Armonk, N.Y.

[22] Filed: Nov. 9, 1972

[21] Appl. No.: 305,021

[52] U.S. Cl. .......... 340/172.5
[51] Int. Cl. .......... G06f 11/00
[58] Field of Search .......... 340/172.5; 235/153 AC

[56] References Cited

UNITED STATES PATENTS

| | | | |
|---|---|---|---|
| 3,237,100 | 2/1966 | Chalfin et al. | 340/172.5 |
| 3,325,788 | 6/1967 | Hackl | 340/172.5 |
| 3,343,141 | 9/1967 | Hackl | 340/172.5 |
| 3,351,917 | 11/1967 | Shimabukuro | 340/172.5 |
| 3,372,379 | 3/1968 | Collom et al. | 340/172.5 |
| 3,380,033 | 4/1968 | Cerny | 340/172.5 |
| 3,405,258 | 10/1968 | Godoy et al. | 340/172.5 |
| 3,497,685 | 2/1970 | Stafford et al. | 235/153 AC |
| 3,585,599 | 6/1971 | Hitt | 340/172.5 |

*Primary Examiner*—Raulfe B. Zache
*Assistant Examiner*—Michael Sachs
*Attorney, Agent, or Firm*—Edward S. Gershuny

[57] ABSTRACT

A universal adapter provides a standard interface to external equipment for testing and generally communicating with a data processing system. Linking main control elements of the system with diverse external test equipment, through a bit-serial binary communication terminal, the adapter provides a basis for establishing initial test conditions in the system while the latter is in a stopped or disabled condition. After initialization, the system is tested in its own dynamic environment at normal system speed. After the test, the system is again stopped or disabled. Responses to tests are sensed by the adapter through comparisons of selected status signals obtained from the system with predetermined reference signals furnished by the external test equipment. The adapter also cooperates with special monitoring circuits to selectively monitor and transmit to the external equipment signals representing internal system status. These signals are recorded and/or analyzed at the external equipment.

8 Claims, 15 Drawing Figures

INTEGRATED DIAGNOSTIC TOOL

BACKGROUND OF THE INVENTION

This invention relates to diagnostic testing of data-handling apparatus. More particularly, the invention relates to such apparatus which will thoroughly test a system while the system is operating at its normal speed.

Patents such as U.S. Pat. Nos. 3,325,788 and 3,343,141, both to F. J. Hackl and both assigned to the assignee of this application, describe a data processing system which is capable of automatically testing itself under internal stored program control. However, before a test program can be loaded into internal (main) storage, it is necessary to have operational in the system a substantial portion of the system input channel circuitry, data handling circuitry, clocking circuitry and practically the entire internal store. Then, before a loaded test program can be executed, it is necessary to have operational the output gating circuit of the internal store.

U.S. Pat. No. 3,585,599 to D. C. Hitt, et al., assigned to the assignee of this application, describes a diagnostic system which is able to operate virtually independent of the system being tested, under external control, to test and verify the status of discrete elements of the system while the system is in a passive or stopped condition. However, as is known to those skilled in the art, it is quite possible for system errors to be of such a nature as to be undetectable except when the system is running at its normal speed. Timing errors and errors due to spurious delays in the data path, for example, would fall into this category. Such errors would not necessarily be detected when the system is tested in a step-wise (single-cycle) manner while it is in a passive or stopped condition.

BRIEF SUMMARY OF THE INVENTION

This invention overcomes the above and other disadvantages of the prior art by providing a mechanism which is able to operate virtually independent of the system being tested while still providing means for testing the system in its own dynamic environment at its normal operating speed. In accordance with one preferred embodiment of the invention, an adapter such as the one described in U.S. Pat. No. 3,585,599 is utilized to initialize the system for testing. After initialization, the system clocks are started and the system is tested in its own dynamic environment at its normal speed of operation. After the test, the system is again stopped so that its responses to the test may be analyzed. In the preferred embodiment of the invention, two alternative mechanisms are provided for stopping the test. The first mechanism will detect the fact that the test has proceeded to a predetermined point at which analysis of test results is desired and will stop the system at this point. The second mechanism comprises a timer (e.g., a clock or a counter) and, on the expiration of a predetermined time interval, will cause the system to stop so that an analysis may be performed. In the preferred embodiment, this predetermined time interval is of sufficient duration so that the first mechanism should have stopped the system before the expiration of the time interval. Thus, the second mechanism acts, in effect, as a "fail-safe" mechanism which will stop the system in the event that a malfunction of some kind prevents the test from reaching the predetermined point which would be detected by the first mechanism.

Various objects, features and advantages of the present invention will be apparent from the following description of a preferred embodiment of the invention as illustrated in the accompanying drawings.

DETAILED DESCRIPTION

Introduction

Figure 1:
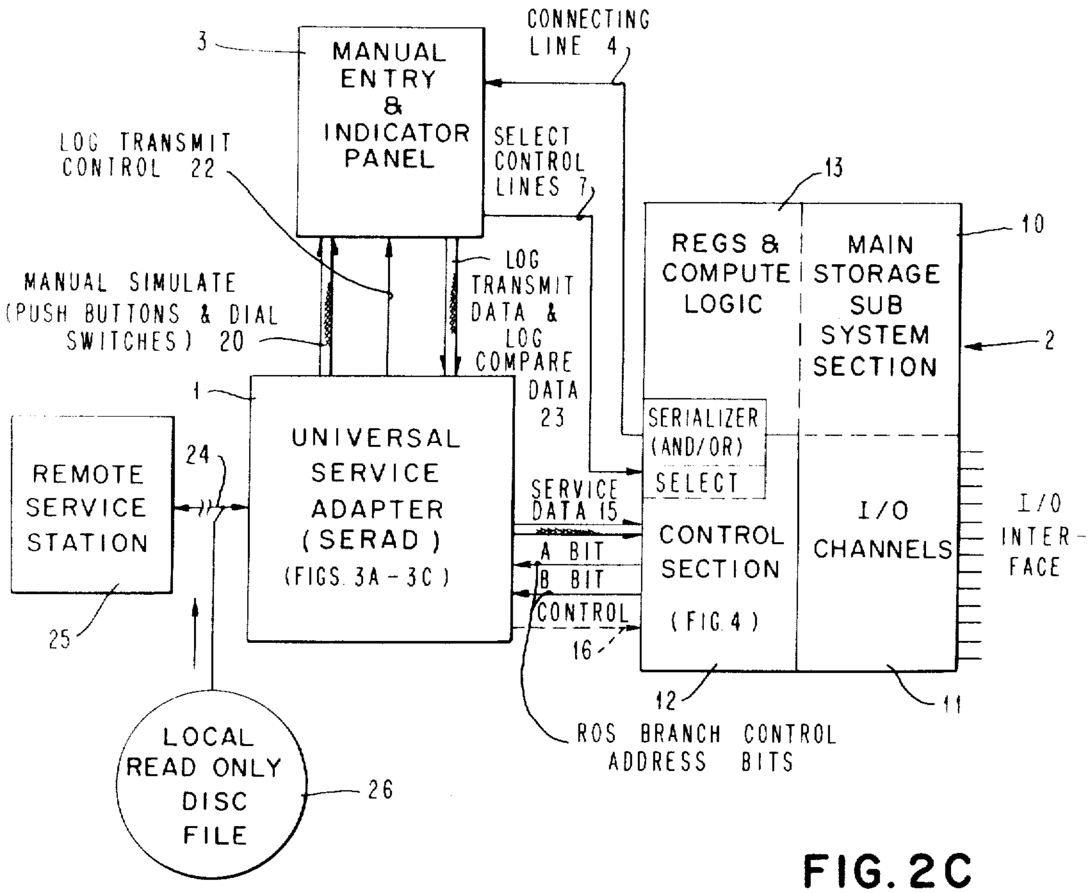
FIG. 1 is a schematic block diagram of the general organization of a system incorporating the present invention.

The specification and drawings contained in the following three patents are hereby incorporated herein:

U.S. Pat. No. 3,325,788 "Extrinsically Variable Microprogram Controls" by F. J. Hackl, patented June 13, 1967;

U.S. Pat. No. 3,343,141 "Bypassing of Processor Sequence Controls For Diagnostic Tests" by F. J. Hackl, patented Sept. 19, 1967;

U.S. Pat. No. 3,585,599 "Universal System Service Adapter" by D. C. Hitt and R. J. Woessner, patented June 15, 1971.

The present invention provides improvements to a known universal service adapter (SERAD) which is described in the above-referenced U.S. Pat. No. 3,585,599. SERAD provides a compact, simple and standardized test and response interface between a data processing system and external equipment seeking to test the system. A bit-serial binary code communication system is used to transmit messages, including diagnostic test control information, from the external equipment to the adapter, and to transmit response messages, incorporating system status intelligence, from the adapter to the external equipment. As may be inferred from the foregoing, the known SERAD is arranged to be able to fully control the system in the test and response observance process, whereby the operativeness of the system, with the exception of SERAD and the system power sources, is not critical to the conduct of any diagnostic test. In the improved system described herein, SERAD essentially relinquishes control of the host system after initialization so that one or more tests may be performed by the host.

Thus, the present invention includes means for relinquishing control to the hose system and for SERAD to recover control from the host system. It also utilizes the normal SERAD nucleus of circuitry devoted exclusively to the functions of controlling SERAD and the host system in which it is incorporated under the control of signals received in messages sent from external equipment. The message communication is standardized, enabling the adapter to couple to a variety of types of test equipment, local and remote. Standardization, in the preferred embodiment disclosed herein, involves the encoding of the test initialization and response messages in bit-serial binary communication code signals including start and stop-bit signals, the latter to delimit consecutive groups of signals (bytes) within the message to aid reception of the byte signals in groups. Communication with the host system is in a form most effective for the host system.

The economy and effectiveness of the organization for internal communication with the host system is enhanced by providing test control connections from SERAD only to key control elements of the host system; specifically, to system clocking controls, to system micro-operation controls and to a buffer register of the indicator console unit of the system. Additional benefits are realized by spatially integrating with LSI (Large Scale Integration) circuit packages of the system, some of the gating circuits through which the adapter transfers signals to the micro-operation control register of the system. Although with this invention the improved system does not have direct access to inputs of all triggers, registers, and other elements of the host system which may need testing, it is sufficient for diagnosis of many system component failures and/or design errors to allow the system to operate its elements after initial conditions have been set via SERAD into the directly accessible system elements.

Various response line connections from the host to the diagnostic adapter enable it to detect, in a coarse "pass/fail" sense, the validity of response of the total system to each test input. Thus the adapter itself may halt the test process and "freeze" the system state after a "fail" response.

With the system state frozen test personnel may attempt to localize the particular cause of a "fail" response through observance of status indicators on the system indicator panel. Repairs may be made by replacing circuit cards. If needed, diagnostic information may be obtained by telephone from personnel at a remote test station which is linked to the adapter. To assist the latter personnel, status logs may be transmitted to the remote station via SERAD, for remote inspection and analysis.

Testing of a system through the improved adapter may involve, progressively: testing operational status of SERAD; testing operational status of the gates interconnecting SERAD and the system micro-operation control register; testing the control register and the control section of which it is a part; testing status of the SERAD — Console subsystem used for status monitoring, indication and log transmission; and testing status of other sections of the host system and its satellite equipment. The latter tests may progress in stages from direct tests of the complete control section, to indirect tests of the address path of the control section, to indirect tests of other elements of the central processing unit (CPU), to indirect tests of the complete central storage facilities, and finally to indirect tests of the input-output channels and peripheral equipment.

Connections from the improved adapter to the host system include: (1) connections to the console unit, for simulating effects of manual operations; e.g., manipulations of panel push buttons and dial switches; (2) connections to the cycle timing controls and the main micro-operation control register of the host system (including new connections for returning control to the adapter after a system test), the latter primarily through group switching circuits spatially integrated with LSI circuit packages of the host system; and (3) connections to system data registers through an External Switch in the main data handling section (CPU) of the system. The control register connections permit selective establishment of status both in the control register and elsewhere in the host system through EMIT connections from the control register to other elements of the CPU section of the host system. Observance of responses of the host system to tests initiated by the adapter is available through examination of states of the host system in adapter comparator circuits. Such observance involves merely sensing the state of the host system.

Normal data flow paths allow the console register to be gated into the data flow. The normal SERAD connections parallel the manual controls on the console panel enabling SERAD (and therefore remote test equipment) to simulate manual input operations at console unit panel keys and dial switches. This serves as a basis for testing the console unit, including its internal controls and its associated log monitoring and indication transferral circuits.

Throughout the remainder of this specification the improved diagnostic tool which is the subject of this invention will be referred to simply as "SERAD."

SYSTEM ORGANIZATION — GENERAL

Referring now to FIG. 1, SERAD is shown as a discrete modular unit 1, within a larger (host) data handling system, including a main section of circuitry 2 and a console unit 3. The latter unit houses the manual controls and panel indicators of the host system. A line 4 is provided for conveying status signals bit-serially from internal registers, status triggers, and other pertinent circuit checking points in the main section 2, to the console unit. Console unit circuits collect such status signals for indication on panel indicators, for storage within console buffers in block units, for transmission to external test equipment via SERAD, and for reapplication to the main section for storage and/or further handling.

Gates 5 and gate selecting circuits 6, in the main section 2, selectively monitor numerous circuit points of the host system, one point at a time, transferring corresponding status signals to the connecting line 4. This activity is controlled by the console unit. Control from the console unit is achieved through coded selection signals sent over a number of selection control lines suggested at 7.

The main section 2 includes sub-sections designated main storage 10, input/output (I/O) channels 11, control section 12, and registers and computing logic 13. Subsections 12 and 13 together are denominated the central processing unit (CPU) of the system. Parts of the CPU are used by the channels 11 for input-output handling relative to storage 10. During such use other functions of the CPU are temporarily suspended.

SERAD, in combination with external equipment, initiates tests of main section 2, through its connections to control section 12 and other connections to be described later. These connections include input (SERVICE DATA) status-setting connections 15 from SERAD to a micro-operation control register ROSDR (FIG. 4) in section 12, cycling control input connections 16 to the main system clocking controls (FIG. 4), and output, or sensory, connections (A, B, bit lines) to SERAD from sequence branch logic circuits in section 12. Main section 2 may be fully free of control by SERAD while being tested (except for a "fail-safe" monitor discussed later). During the running of tests, the main section receives cycling control inpulses from its internal system clocking controls.

SERAD also initializes tests of the console unit 3 through MANUAL SIMULATE connections 20 electrically paralleling manually operated push buttons and dial switches on the console panel.

SERAD and the console unit interact for external status transmission via LOG TRANSMIT control lines 22 and LOG TRANSMIT data lines 23. SERAD presents status log message signals externally in bit-serial form, with group Start and Stop bits added. The message signals are carried out over binary communication terminal 24 attached to SERAD.

Terminal 24 generally carries two-way message communications between SERAD and remote testing equipment such as 25 (test initialization messages into SERAD, status messages out to the remote equipment), and one-way communications (test initialization messages into SERAD) from local disk record playback equipment 26, the latter operating in a playback only mode for the sake of economy. In the preferred embodiment message signal communication in either direction is bit-serial, in 11-bit byte groups, with each byte group containing a pair of start and stop bits for reception synchronization. A conventional modem (not shown) may be included in the terminal 24 to modulate and demodulate the transmission impulses. The communication medium may be wire, teletype, telephone, radio, or any suitable transmission medium, the exact form of the same being immaterial to the present invention. With sophisticated external computing equipment at centers such as 25 SERAD may be used to conduct basic design evaluation and manufacturing tests on its host system. With less elaborate equipment such as Disc Package 26 (Load Diagnostic LD File) SERAD may be used in field diagnostic tests of a more primitive nature.

Data Flow Drawing Conventions (FIGS. 2A–2D)

In data flow diagrams to be considered later conventions indicated in FIGS. 2A–2D are employed. Numbers such as 0 and 35, in opposite corners of the rectangle used as the symbol for a register (FIG. 2A), denote the bit capacity (36 bits in this instance) of the register, and the relative significance, of bits entering the register (0-most significant) when the bits are part of a number representation. Groups of parallel input connections to a register, with gating implied, are shown by horizontal lines above the register symbol and for each group a single line extending downward to the horizontal line.

The horizontal line represents a group of input gates and its vertical extension represents a corresponding group of bit carrying input lines feeding the gates. The number of elements in any group is proportional to the relative length of the horizontal line representing the group compared to the width of the register rectangle. The register positions to which the lines of an input group connect are defined by the positions of end points of the associated horizontal lines.

Figure 2A:
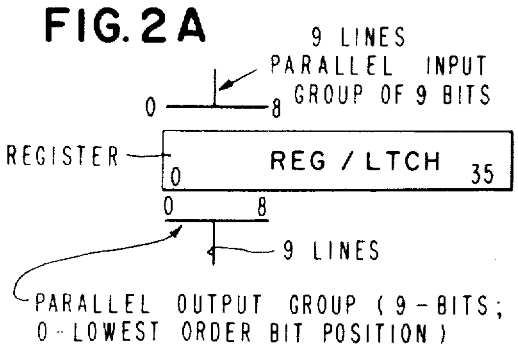
FIGS. 2A through 2D illustrate drawing conventions used in the data flow diagrams of other figures of drawing.
Figure 2B:

Thus, the horizontal line at the left extreme position over the register in FIG. 2A, represents a nine-bit input group (one-fourth of the 36 bit capacity) connecting to the nine left-most register bit positions 0–8.

The register output gating and line grouping conventions are the same as the input conventions but with the output group represented in size and numerical significance by a horizontal line beneath the register symbol.

Parity Check circuits are represented (FIG. 2B) by a rectangle with the notation "PC."

Figures 2C, 2D:
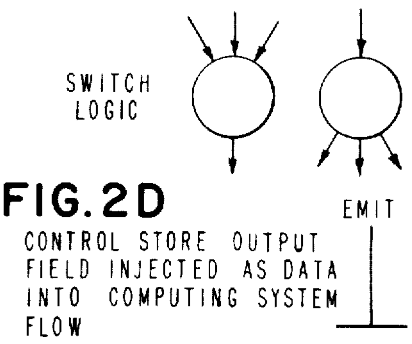

Switching logic is indicated by a circle (FIG. 2C). Arrowheads denote the direction of flow through a switching point. Connection of a group of input lines to a selected one of several groups of output lines is indicated at the right. Connection of a selected one of several input groups to one output group, is suggested at the left in FIG. 2C.

The notation "EMIT" (FIG. 2D) represents a signal field originating at the control register (ROSDR-FIG. 4) of the control section (FIG. 4) of the host data processing system. Transfers of control information from the control register into the data signal handling paths of the host system are made through EMIT field connections. The control section of the host system thereby rpovides, in parallel with the micro-order control information for controlling system gates, direct information signals (through the EMIT outlets) which are useful as predetermined processing data (e.g., constants) and as diagnostic test information (e.g. to induce predetermined system states for test purposes). The actual use made of the "EMIT" outlets in diagnostic testing will be considered in greater detail later.

SERAD Data Flow

Figures 3A, 3B, 3C:
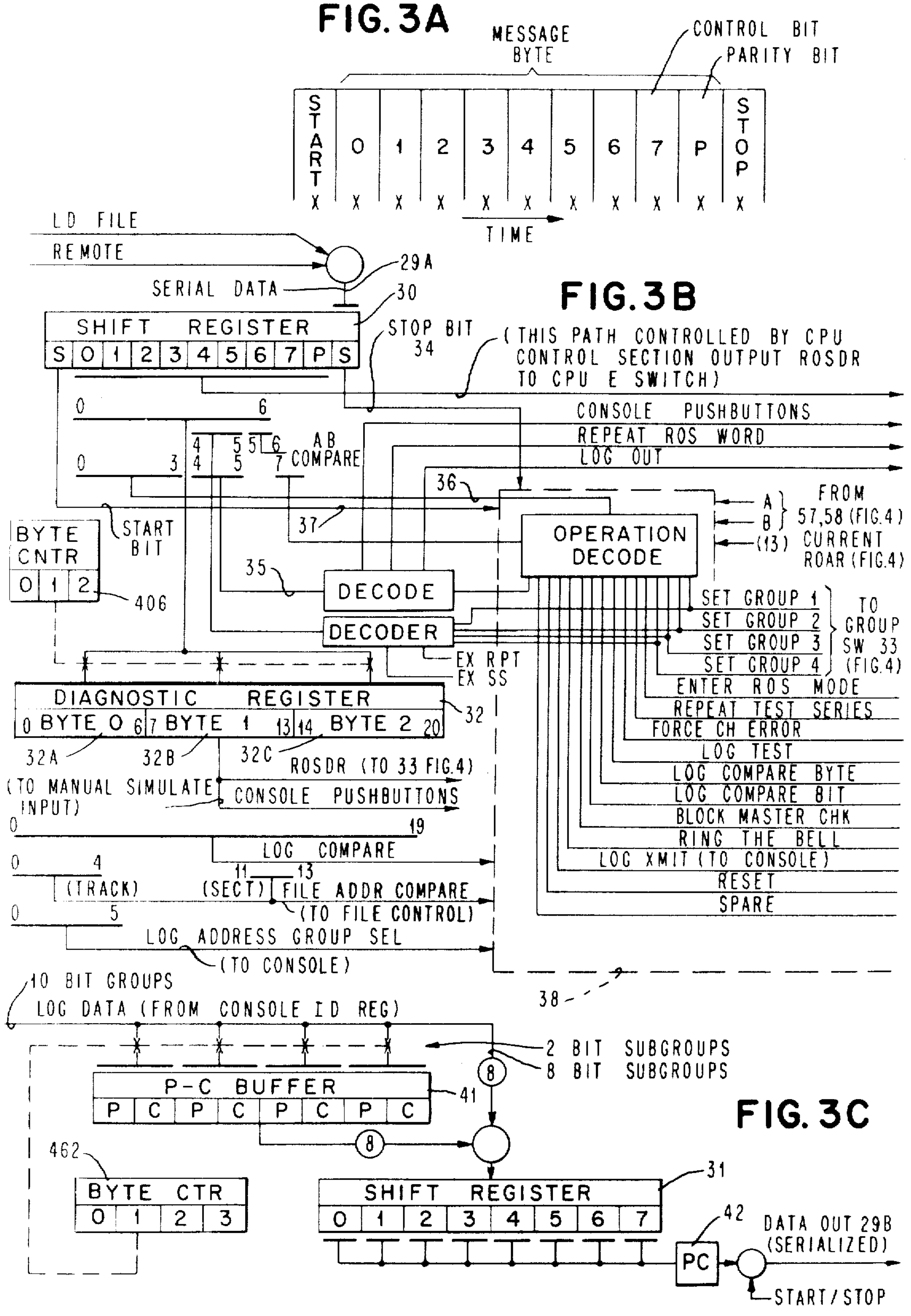
FIG. 3A indicates the format of information received in FIG. 3B.
FIG. 3B is a data flow diagram of the receiving and control sections of the subject adapter.
FIG. 3C is a flow diagram of the transmitting section of the adapter.

As shown in FIGS. 3B and 3C SERAD contains External Communication terminals 29A, 29B. Connected to these are respective shift registers 30 and 31, each of 11-bit capacity. Register 30 is coupled to receive incoming binary message signals (test initialization messages) in bit-serial fashion from terminal 29A. Register 31 is coupled to transfer outgoing binary message signals (status messages) bit-serially to terminal 29B.

Figure 4:
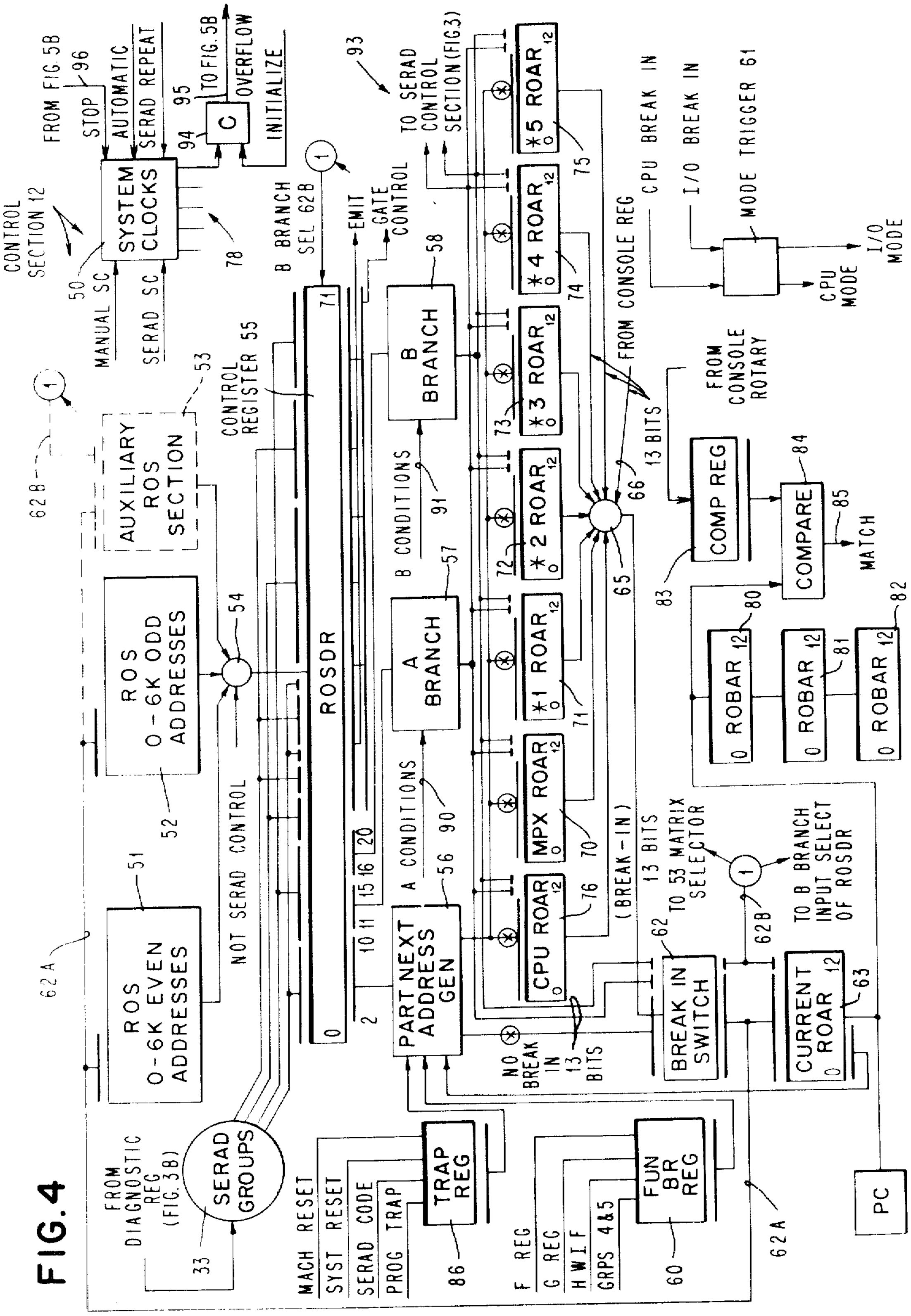
FIG. 4 is a data flow diagram of the control section of the data processing system which incorporates and is tested through the present invention.

Diagnostic Register 32 is connected to receive information in parallel byte groups from register 30 under conditions described later. Groups of seven bits are placed selectively in the three sections of register 32 — sections 32A, 32B, 32C — until the 21 triggers of the register hold a desired configuration of bit representations. Under conditions described later the 21 or less bits of a desired configuration established in register 32 are transferred in group parallel to a selected section of the system microoperation control register ROSDR (FIG. 4). The selection of sections of ROSDR in such transfers is determined through group switching circuits 33 (FIG. 4). The latter circuits are spatially integrated in the LSI circuit packages of the control section 12 (FIG. 4), for efficiency of signal handling and circuit organization, but are controlled from SERAD.

Up to four transfers through the four "positions" of the group switch circuits 33 shown in FIG. 4 may be needed to establish a desired initialized test state configuration in the system Control Register ROSDR. However, for some tests a single transfer will suffice. The manner in which signals are transferred to the control register and utilized therein to control the operation of the data processing system for test exercises will be described in detail later.

Circuit connections 34–37 from register 30 to Control Section 38 establish basic control states of SERAD in accordance with external signals transferred to the register from terminal 29A. The control section 38 includes circuits needed to control sampling (strobing) and entry into register 30 of message bits sent from external equipment and external transmission, from register 31 to external equipment, of system status messages. Other circuits in section 38 are responsive to information signals in register 30 to control internal handling of signals between registers 30 and 31 and other parts of the system.

Binary bit signals are assembled statically in register 30, from the serial test initialization message signals on the external lines feeding terminal 29A, into parallel byte signal groups of 11 bits. A typical byte group (FIG. 3A) includes a start bit, an intelligence byte sub-group (bits 0–7 and bit 8 which is usually a parity check bit P), and a Stop bit (binary inverse of Start bit). Intelligence byte sub-groups are subjected to one of several forms of handling in a manner described later. Received bytes distinguished as control bytes (bit 7 = 1) are decoded by SERAD controls 38 to control internal functions of SERAD and functions of the central system. Received bytes not so distinguished are transferred to register 32, under SERAD control. Bytes may also be transferred to central system (CPU) registers via a CPU External Switch under CPU (ROSDR) control (FIG. 4). Register 32 is connectible directly, under SERAD control, to either the CPU control section (ROSDR, FIG. 4), the console unit, or comparison logic within control section 38 of SERAD.

Outgoing status messages are transmitted bit-serially through SERAD to external lines. Status information included in such messages is first placed in shift register 31 in parallel byte groups of eight bits which are thereafter shifted out serially at terminal 29B with start, stop, and parity bits appended by SERAD control circuits. When the transmitted information represents system status received through or from the console unit each eight-bit status byte transferred to register 31 is accompanied by a pair of check bits (parity and parity check status). These are placed separately in parity byte buffer 41 (FIG. 3C) until eight such bits are assembled into a parity byte. Parity bytes accumulated in buffer 41 are intermittently transferred into register 31, intermediate groups of four status bytes, and thereby are incorporated in the externally transmitted status message. Parity generation circuit 42 (FIG. 3C) appends a SERAD parity bit to every byte shifted out of buffer 31 including the parity bytes received from register 41.

The separation within the status message of system status bytes and parity bytes is useful as a diagnostic aid. The parity generated by SERAD generator 42 may be used to detect transmission errors and the parity within the interleaved parity bytes may be used to identify byte handling conditions preceding the transmission (e.g., the conditions of bytes when transferred earlier from the console unit to SERAD).

Thus, at the external receiver, detection of an error in any single transmitted byte suggests that an error occurred either in transmission of the byte or in the parity generation facility of SERAD. On the other hand, a parity or parity check error found by examining a status byte and the associated portion of a separately transmitted parity byte may uniquely identify the source of an error condition originated prior to transmission (e.g., in the console unit or even "further back" in the system circuitry).

Main Control Section Data FLow

The control section (FIG. 4) includes a read only store system 50 of a type described by Tucker in "Microprogram Control For system/360," IBM Systems Journal, Volume 6, Number 4, 1967, pp. 222–241. Each matrix section 51–53 contains configurations of information bit representations in the form of capacitive couples and non-couples at intersections of relatively orthogonal drive and sense wires. The couples are determined by punches in a sheet or card of dielectric material separating the drive and sense lines. Each matrix section 51–53 holds a pattern of code 72 bits in one dimension by 3,000 bits in a perpendicular dimension. The matrix drive selection lines are excited in parallel in each computing cycle to deliver up to three 72-bit control words, from three corresponding rows of the three sections 51–53. A selector network 54 is operated in each basic operating cycle to select one of these three words as the main source of system control for the ensuing cycle by transferring the same to the micro-operation control register 55 (ROSDR).

Each word entered into ROSDR represents a system micro-instruction specifying the instantaneous gating status of the system for its current cycle of operation and partially specifying the next address (along the said perpendicular dimension of the three matrices 51–53) of the group of three microinstructions from which the control state of the following cycle will be determined. Groups of such microinstructions form microprograms of control analogous functionally and logically to a sequence counter, but more adaptable to change and modularization.

In comparison to the exemplary Tucker System the present control system of FIG. 4 contains the following features:

1. Plural matrices 51–53 with outputs selectable as at switch 54 in the present FIG. 4 afford greater selectivity and modularity of control.
2. In the present system the normal "next-in-sequence" control address (e.g., the address used when the microprogram is not being interrupted by a BREAK-IN) is a group of 13 bits, produced by logic circuits 56–58. This group includes two conditional branching bits (A, B), rather than one such bit as in the Tucker example. Hence the branch is a more flexible "four-way" branch as distinct from a "two-way" branch (the advantage of this, as explained in U.S. Pat. No. 3,325,785 to W. Y. Stevens, being that a choice of one of four distinct next microprogram states may be made in one cycle rather than two cycles). The B-bit is used to determine which matrix output is to be selected.

3. Although not shown in FIG. 4 the present system includes a LATE ROSDR register, as a back up to the main ROSDR register 55, for the purpose indicated by Tucker; namely for the purpose of extending the effect of the current microinstruction control representation late into the current cycle while a successor (next) microinstruction is being transferred from ROS (51–53) to ROSDR 55.
4. A Mode Trigger 61 (FIG. 4) controls "dual usage" (CPU Mode — I/O Mode) of the control system similar to the "dual usage" described on page 232 of the Tucker article but with certain differences in circuit detail and technique noted below.
5. Late in each basic system cycle (e.g., one "tick" of the basic system clock) selector switch 62 supplies a next control address in parallel to the matrix selection lines (62A, 62B), and to the control address register 63 designated CURRENT ROAR. The selection lines transfer a corresponding microinstruction code representation from one of the matrices to ROSDR as the control for the following cycle. Each next address is obtained either from the normal "next-in-sequence" Address logic 56–58 (NO BREAK-IN), or from the BREAK-IN selection path 65 when the current microprogram is temporarily interrupted by a BREAK-IN function (e.g., to service a channel transfer request).

The eight sources of initial microprogram addresses feeding selector path 65 are the "cable " 66 from a console register (not shown herein) and the seven buffer address registers 70–76. The registers 70–76 are respectively designated MPX ROAR, No. 1 ROAR, - - -, No. 5 ROAR, and CPU ROAR. The first six of these buffer registers preserve initial addresses for I/O Mode microprograms associated respectively with six Input/Output channels (a multiplexor channel MPX, and five selector channels, CH 1-CH 5). The last-named register (CPU ROAR) effective in CPU Mode operations, preserves microinstruction addresses of "next-in-sequence" microinstructions for recovery of sequence following BREAK-IN.

In continuous micro-sequences the BREAK-IN path 65 to CURRENT ROAR, and to matrix selector lines 62A, 62B, remains blocked and each next address is transferred to CURRENT ROAR and to the matrix selector lines 62A, 62B through the NO-BREAK-IN path from Next Address circuits 56-58. Concurrently the same addresses are preserved, in anticipation of a BREAK-IN interruption, in one of the buffers 70–76 associated with the current microprogram function. When the control system operates in CPU mode (Trigger 61 in CPU mode state) preservation of next cycle addresses occurs in CPU ROAR 76. In I/O mode (mode trigger 61 in I/O mode state) next addresses are preserved in one of the channel ROAR's 70–75 or, in certain instances, in CPU ROAR.

During a BREAK-IN cycle a path is established late in the cycle (after normal next address transference) from one of the initial address sources (66, 70–76), in particular the source associated with the cause of interruption, to CURRENT ROAR and to selector lines 62A, 62B. Simultaneously a new "preservation" path is established for cycles subsequent to the BREAK-IN (until the next BREAK-IN), from Next Address circuits 56–58 to the same one of the registers 70–76 (when an initial address is obtained from the Console Register source 66 a "preservation" path nevertheless is established between circuits 56–58 and one of the registers 70–76 associated with the function being initiated from the console).

6. The switching circuits 33, although spatially integrated with circuit elements of the ROS system of FIG. 4 are controlled from SERAD control section 38 (FIG. 3B) and connect the SERAD DIAGNOSTIC REGISTER 32 (FIG. 3B) to sections of ROSDR. Thus the circuits 33 represent a portion of a link between external test equipment and ROSDR through which arbitrary initial control states may be established ("forced" in ROSDR instead of using the system control store.
7. "System Clocks" 78 provide cycling impulses for control of system advancement in either automatic (continuous) sequences or in individually controlled single cycle steps (the latter initiated either manually or by SERAD SC impulses). The NOT SERAD control line to selector switch circuits 54 enables the transfer path between matrices 51–53 and ROSDR only when SERAD is either inactive or exercising only partial control over control sequences of the system. With SERAD in control this path is inhibited and inputs to ROSDR are received only through the SERAD switch 33, ROSDR remaining unchanged between input settings despite possible advancement of other parts of the system by impulses from "System Clocks" 78.
8. Connection path 66 affords access to CURRENT ROAR from the Console Register for manual and simulated manual control of micro-sequencing.
9. CURRENT ROAR together with three "back-up" registers ROBAR 1 (80), ROBAR 2 (81), and ROBAR 3 (82) operate as a chain to preserve a history of the four most recent conditions of the control system as an aid in fault diagnostics.
10. COMPARE REGISTER (83) settable from the console provides comparison references to COMPARE circuit 84 for comparison with the state of CURRENT ROAR. A match output 85 is an indication to the system that a particular system state specified by settings of switches on the console panel has occurred.
11. EMIT field (positions 64–71 of ROSDR) enable the control system (and therefore SERAD via its connection to ROSDR) to inject data representations directly into the system data paths and registers.
12. Specific control functions obtained by decoding the various fields of ROSDR are designated in the following list.

| ROSDR Field (Bit Positions) | FUNCTION (CPU Mode unless otherwise stated) | Field Designation |
|---|---|---|
| | Parity (odd) of ROSDR bits –35 | P |
| 1 | Enable/Disable the BREAK-IN function for I/O "micro-interrupts" | BI |
| 2–4 | Bits 4–6 of next address (next-in-sequence address to be set into CURRENT ROAR and the associated function buffer in group 70–76) | NAA |

-Continued

| ROSDR Field (Bit Positions) | FUNCTION (CPU Mode unless otherwise stated) | Field Designation |
|---|---|---|
| 5–8 | Bits 7–10 of next address if a Function Branch is not specified by ROSDR field BRC below, or bits -3 of next address if a FUnction Branch is specified. Bits 0–3 are unchanged from previous cycle address in CURRENT ROAR when a Function Branch is not specified. | NAB |
| 9–10 | This Branch Control field decodes into three distinct conditions specifying one of a possible three particular branch addresses associated with two "Forced Restrictions on the Condition Branch" and one Function Branch. The two forced restrictions on condition branching ("force B Bit to 1 if A Bit is 0", and "force B Bit to 1 if A Bit is 1") restrict the AB code produced by circuits 56, 58 from its normal four-position range to a three-position range, thereby conserving "next microinstruction" space in ROS matrices 51–53 in accordance with the teachings of U.S. Pat. No. 3,325,785 to W. Y. Stevens. When a Function Branch is indicated register 60 (FUNCTION Branch REG) indicates the source of bits 7–10 of the next address to be one of the following: GP STATS (General purpose condition indicating register), bits 0–3 or 4–7, F Register, G Register, or "hard-wired" I-FETCH status (the predetermined code signal to initiate handling of the next program instruction out of the instruction buffer queue IB). | BRC |
| 11–15 | Source of A Branch Bit of next address (selects "A Condition" input to logic 57 from up to 32 possible input sources) | ABR |
| 16–20 | Source of B Branch Bit of next address (selects "B Condition"input to logic 38 from up to 32 possible input sources) | BBR |
| 21–25 | Status setting control for establishing status settings in STATS, A Byte Counter, B Byte Counter, and L1 Counter, either directly or indirectly as a function of another parameter such as the EMIT field (ROSDR 64–71). | SS |
| 21–22 | Used in I/O Mode to control priority of pending service requests from I/O channels, by enabling individual selector channels to present requests of different absolute rank, ranging from level 3 (lowest rank) to level (highest rank). Concurrent requests of like rank from different channels are handled in a predetermined order of priority assigned to the channels. Requests of different rank are handled in the order of rank (e.g. highest to lowest). Requests from MPX channel are always assigned rank level 3. CPU Mode microprograms also have an effective rank of level 3 subordinate in priority to all level 3 channel requests. | IOPR |
| 23–25 | Status setting control in I/O Mode. | IOSSB |
| 6– | | |
| 26–29 | Control function of arithmetic logic unit ALU (ADDER, MOVER) in cooperation with the Mover Function Register for Mover control. | XYALU |
| 30–32 | Selects U input to Mover and/or X input to Adder. | UX |
| 33–35 | Selects V input to Mover and/or Y input to Adder. | VY |
| 36 | Parity (odd) of ROSDR bits 36–62. | P |
| 37–42 | Selects Fetch (Read) or Store (Write) function in local storages LS. Specifies source of local storage address (one of several LSAR registers). | LS |
| 38–41 | Selects Store (Write) LS function for transfers in I/O Mode from channel or CPU registers or main storage, to LS. Each channel has a fixed sector in I/O LS reserved to it and only the word position within the sector and, when necessary the byte position within the word need be specified for any transfer. | LSWR |
| 42–44 | Selects Fetch (Read) LS function for transfers in I/O Mode from CPU LS to channels or CPU registers or Main Storage | LSRD |

-Continued

| ROSDR Field (Bit Positions) | FUNCTION (CPU Mode unless otherwise stated) | Field Designation |
|---|---|---|
| 43–47 | Miscellaneous control for access to main storage, for routing of data signals to registers from External Switch input sources, and for control $R_1$ $R_2$ counter. | MISC |
| 45–47 | Selects transfer function (Read/Write) of main storage in I/O Mode transfers; also selects inputs in I/O Mode to STATS and A and B Byte counters to control ALU and External Switch paths. | IOSTG |
| 48–51 | Controls counting action of A Byte and B Byte counters ("up" or "down" according to state of an "up/down" Stat), counting action $L_1$, $L_2$ counters in cooperation with a "couple" stat, and setting of status, for retry function, into stats denominated SDC, EE, IFTN. | CNT |
| 48–51 | I/O Mode status setting; used with field -)SSB. | IOSS |
| 52–55 | Adder Out bus (Z) destination (e.g. designate path from result output of adder/shifter logic to A Register). | Z |
| 56–59 | Destination of adder/shifter/mover logic output; mainly destinations of control bytes to working registers (e.g. $L_1$, $R_1$, A and B Byte counters). | ZW |
| 60–62 | XY Select to adder input, shift control for 1 and 4 place shifts. In shifting operations the EMIT field controls "spill-over" destination (F, Q, or Z Reg.) or interchange of F and G register contents. | XYSH |
| 60–62 | Effective in I/O Mode to control I/O Data Flow between peripheral devices and I/O local storage, by gating inputs to and outputs from the one-byte channel buffers. When CPU ROAR (FIG. 4) is preserving next addresses in an I/O Mode microprogram sequence (e.g. a sequence initiated from a CPU mode microprogram sequence) the channel buffer path being worked is selected by the L2 counter. When I/O ROAR's are effective in the next address loop individual channel controls, not shown, designate desired paths. | IODF |
| 63 | Parity (odd) of ROSDR bits 63–71. | P |
| 64–71 | ROSDR bits transferrable as data into registers and logic units (ALU) of the CPU. Also used in conjunction with other fields (status setting fields, Local Storage function fields, and XYSH field) as a source of additional control (extended control field). | EMIT |

In response to a "Trap" condition, indicated by exception triggers (not shown), the normal next address of logic 56–58 is suppressed and a predetermined initial address code of one of four "trap" microcprograms is injected into the "NO BREAK IN" path to CURRENT ROAR to terminate the current operation of the computer. Although related to the class of operations known as interrupts, this particular operation resembles a branch more than it does an interruption since the operation in process just prior to the trap is discontinued without remembrance of status and cannot therefore be automatically resumed. As suggested by the named inputs to TRAP REG 86 (FIG. 4) the source of the initial address of the "trap" microprogram, is a pre-wired code associated with one of the following: Machine Reset, System Reset, SERAD Controlled Reset, Program Trap. Machine and System Resets differ in that Machine Reset affects only the CPU state while System Reset alters the total system state (CPU, Storage, Console, I/O Channels I/O Control Units, I/O Devices).

SERAD control of the control section 12 of FIG. 4 begins with an initialization phase wherein SERAD injects control fields into ROSDR with the system in a stopped condition (all clocks suppressed). Following the initialization, the SERAD described in U.S. Pat.

No. 3,585,599 provided three options: (1) the host could be caused to operate for a single cycle; (2) the host could be allowed to operate for a multiplicity of cycles with gate 54 disabled (thereby preventing any readout from ROS to ROSDR); or SERAD could totally relinquish control. With the improved SERAD described herein, a fourth option is provided: (4) the host may be allowed to operate in its normal dynamic environment (gate 54 enabled by NOT SERAD CONTROL) until it either reaches a predetermined point in its processing or a predetermined time interval expires, at which point (or time) the system clocks will again be stopped and SERAD will resume total control.

Part of the mechanism which provides this fourth option is a timer such as counter 94 which will be incremented each CPU cycle. If the host does not reach a predetermined point in its processing before counter 94 overflows, a signal on line 95 will cause circuitry shown in FIG. 5B to generate a signal on line 96 which will stop the system clocks, thereby freezing the system. At this point SERAD will resume control.

Another part of the mechanism which provides this fourth option is cable 66 (FIG. 4) which, as mentioned above, provides a path through which a console register can be used to supply an initial microprogram address to selector 65. This path is utilized in signalling completion of a CPU test.

SERAD controls the integrated group switching 33 (FIG. 4) to establish desired states in any of all ROSDR fields. This together with the data transfer capability of the ROSDR EMIT field (ROSDR 64–71), the SERAD input coupling to the External Switch, and the SERAD input coupling to the console register, enable SERAD to control or dominate status anywhere in the system by direct or indirect manipulation. In cycles of system operation controlled from SERAD, inputs to ROSDR from sources other than the Group Switches 33 (e.g., from switches 54) are blocked. Thus the system clock may be permitted to run for a limited number of cycles under SERAD control and the state of ROSDR will merely be repeated in each cycle although other parts of the system are changeable due to the cumulative effect of repeated application of the ROSDR control state (this is the second option discussed above).

The A-Bit and B-Bit conditional branching lines of the next address controls (FIG. 4) are coupled to SERAD control section 38 (FIG. 3B) via extensions 93 (FIG. 4), enabling SERAD to compare reference A and B conditions received from the external equipment, as part of the test initialization message, with the actual conditional branch state of the ROS control system. This tests the entire system state, in a coarse pass/fail sense, since numerous elements of the CPU and channel systems are directly coupled to the "A-Condition" and "B-Condition" inputs to circuits 57, 58 (FIG. 4). Further, since the CPU has considerable control over the channels are peripheral I/O equipment, the A, B comparison may provide useful system status information indirectly, although the location of a system fault may not always be resolved thereby.

Under SERAD control each ROSDR bit is separately determinable. Thus there are virtually $2^{72}$ system microinstruction states which may be established under external control, as compared to the 9,000 microinstruction state representations available in the ROS matrices 51–53. Thus SERAD represents not only a focal point for external tests but also, through its connection to ROSDR, a remarkably flexible status inducing device which is not restricted by the normal control pattern of the system. This for example enables external test gear to operate discrete system elements or circuits in a manner not permitted by the fixed internal structure of the system and even alien to its normal operation.

The clocking section 78 includes an oscillator for basic cycle definition and an eight element ring counter (eight cascade connected triggers) not shown in the drawing. When coupled to the oscillator, the ring counter generates eight progressively delayed overlapping pulses, each of approximately 30 nanoseconds duration, in response to each oscillator cycle impulse. CPU cycles defined by the oscillator-counter have durations of approximately 115 nanoseconds (the period of the oscillator). The counter output exerts phased control over specific flow path segments of the CPU and control section (FIG. 4).

Oscillator impulses may be released to the counter ring in either an uncontrolled stream (normal automatic operation) or in discrete randomly timed units (single-cycle operation). The type of operation is controlled either by SERAD or by a two-position toggle switch (not shown) on the system panel. In the single-cycle position this switch partially enables gates and logic triggers which are further controlled by single-cycle control impulses from one of several sources (i.e., from a START CLOCK pushbutton on the panel) to release one and only one oscillator impulse to the counter ring in response to each control impulse from the then controlling source.

SERAD Operation

Referring to FIGS. 3A–3C and 5A–5C, the SERAD unit operates as follows when receiving signals in shift register 30 from external equipment (e.g., LD disk or remote processor). The SERAD controls idle awaiting the appearance of a bit strobe signal from the external equipment connected to terminal 29A. Upon appearance of the first and each succeeding bit strobe signal register 30 is shifted left one bit position and the bit at 29A is placed in the Stop (right most) position of register 30. When a bit appears in the Start (left most) position of register 30 byte reception is complete. The parity (P) and stop bit positions of register 30 are validated before any further action is taken. If an error is sensed, an Input Error latch is set in SERAD control section 38 and a control switch also in section 38 is examined to determine whether further action relative to the LD Disk system is required. With the control switch in disabled position the system resumes byte reception by resetting register 30 and awaiting appearance of the next bit strobe signal. With the control switch in Normal position the LD disk file to the SERAD input 29A is disengaged and a "WAIT FOR RESET" latch in section 38 is set, effectively placing the SERAD system in a stopped condition while trouble with the LD disk file system is diagnosed through manual or other means. On resumption of operation, register 30 is reset and the system awaits the appearance of a first bit strobe from the transmitting source. It is noted at this point that the LD disk file system is controlled to inhibit transmission of bit strobe signals from its "strobe track" until a desired segment of information track appears beneath the reproducing head of the disk. Hence the SERAD receiving system does not begin to receive bits until such time. The manner in which the desired track and sector of the disk are recognized is discussed later.

If the parity and stop bits of a just received byte in register 30 are both valid, the SERAD system proceeds to determine what next to do with the information.

The DATA MODE latch in section 38 is examined to determine whether the data in register 30 is to be sent to the CPU system registers via the External Switch, under system (ROS) microprogram control. If the DATA MODE latch is not set (SERAD in control) the signal in bit position 7 of SERAD register 30 is examined by control section 38 to determine whether information in bit positions 0–6 of the same register represents SERAD control (command) information or other information (data byte).

Data bytes (register 30 Bit 7=0) are handled automatically from register 30 over to one of three byte sections of the diagnostic register 32 designated by the byte counter (FIG. 3B). The byte counter is then advanced, register 30 is reset, and the system idles to await appearance of the first bit strobe signal of the next byte to be received in register 30.

SERAD command bytes (bit 7=1 in register 30) are decoded by decoding logic in SERAD control section 38 initiating one of the following operations. Information may be transferred from the diagnostic register 32 (FIG. 3B) to the system control register ROSDR (FIG. 4). Following such transfer the CPU system may be operated by SERAD for a single clock cycle, and the states of the A and B system branch control signals (logic 57, 58, FIG. 4) may be compared to reference information in bit positions 5 and 6 of register 30. Other operations which may be performed include: introduction of a forced error condition into a channel presently linked to the main system, control feedback to the LD disk unit, "ENTER ROS MODE" operation (transfer of control to the CPU system re-enabling CPU clocks and ROS), a REPEAT EXECUTE operation (partial transfer of control to CPU, whereby the CPU clocks run with inputs to ROSDR blocked until a next command byte is received in SERAD register 30), a dynamic test of the CPU at normal CPU speed, console control operations to simulate operations of manual elements on the console panel and/or to initiate logging (monitoring) functions, comparison operations comparing system or console information to information in SERAD (register 30 or 32), setting an Ignore Error latch in the CPU to cause the CPU to be released from a disabled condition following an error, or operating an audible alarm bell in the console unit.

The log transmit operation is initiated either upon decoding a log transmit SERAD command (1101xxx1 in bit positions 0–7 of SERAD register 30) or upon receiving a TP log signal from the system microprogram controls (FIG. 4). When system control is exercised the SERAD diagnostic register 32 is initially reset.

The SERAD byte counter (FIG. 3B) and a TP log control latch are respectively reset and set. Console information is fetched to SERAD registers 31 and 41 in 10-bit byte groups (eight information bits 0–7 to register 31, one parity bit P and one console parity check status bit C to register 41). Sixteen such groups are fetched as a set in one log transmit operation, and SERAD transmits the set in 20 of its transmission bytes.

The console store holds 512 bytes which would be equal to 32 groups of 16 bytes. Thus an address designation is needed to distinguish which group of 16 bytes is to be fetched. This is provided by five of the seven bits of byte 0 of the diagnostic register 32 (LOG ADDRESS GROUP SELECT) from information established therein either from the external equipment (via SERAD register 30, prior to a SERAD TP log) or by the act of resetting the diagnostic register (from system micorprogram control), the reset condition designating a first 16-byte group.

The information to be fetched has been either pre-set into the console store 330 or is taken directly from the serializer log net (funnel), depending upon a sixth bit in byte 0 section of the diagnostic register. Information preset into console store 330 has been placed there either under system microprogram and Console Op Decode control, through operation of the added (Z) — bus to console register and console register to console storage circuit paths, or under SERAD control through log commands (Bits 0–7 of reg 30 = 010010x1, or 1000xxx1).

SERAD Controls

Figure 5A:
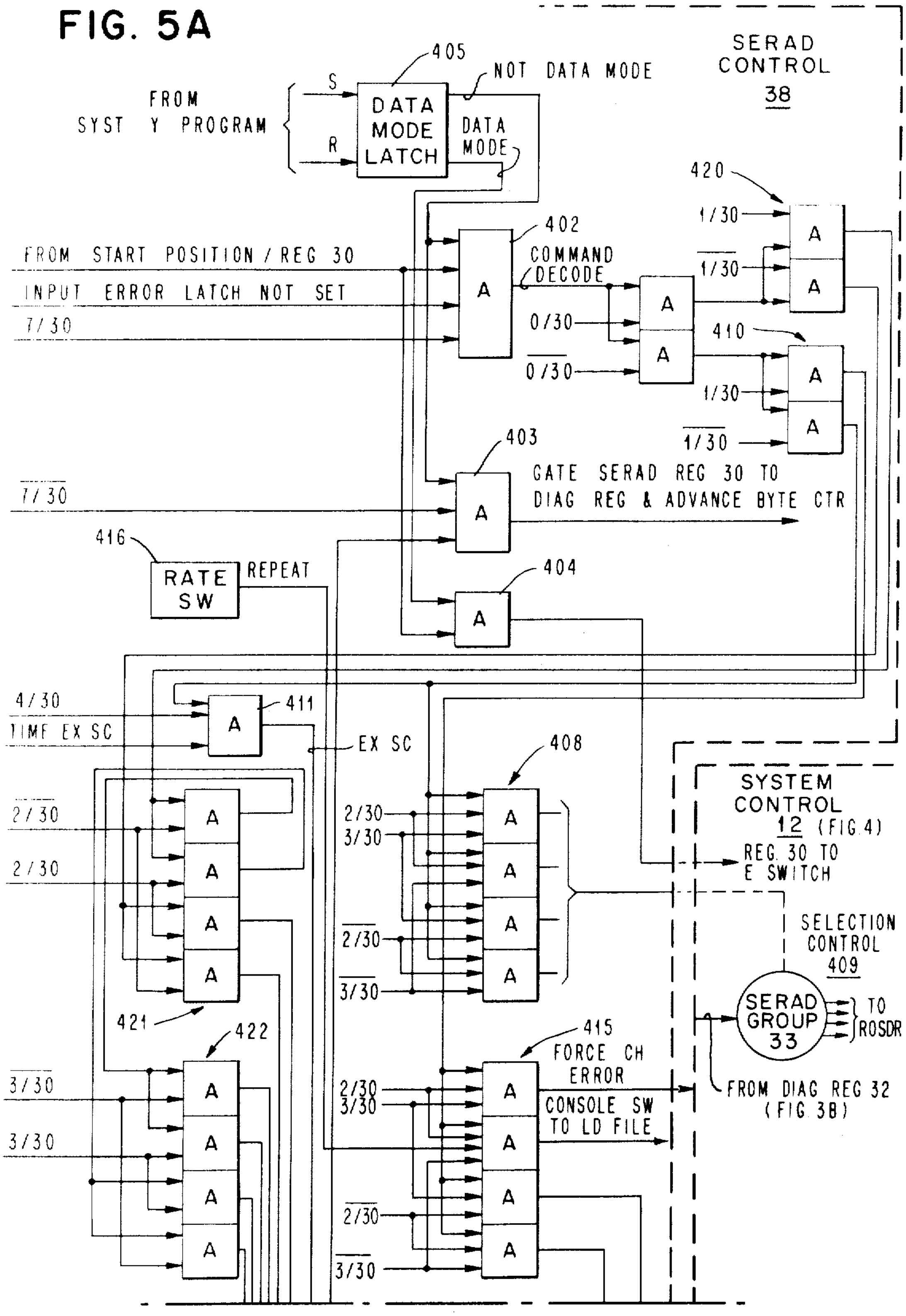
FIGS. 5A–5C illustrate pertinent details of the control section of the improved adapter.
Figures 5, 5B:
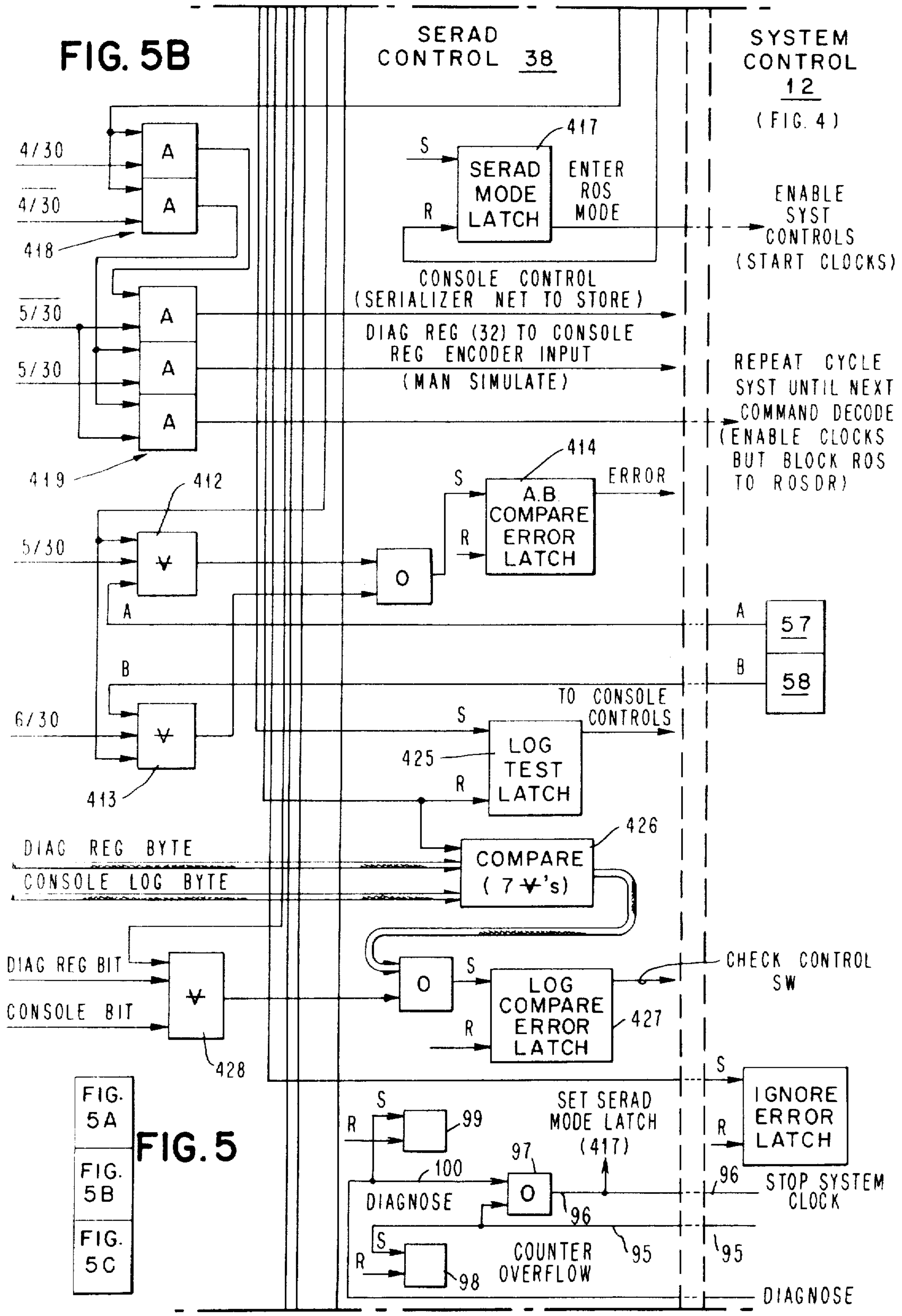
Figure 5C:
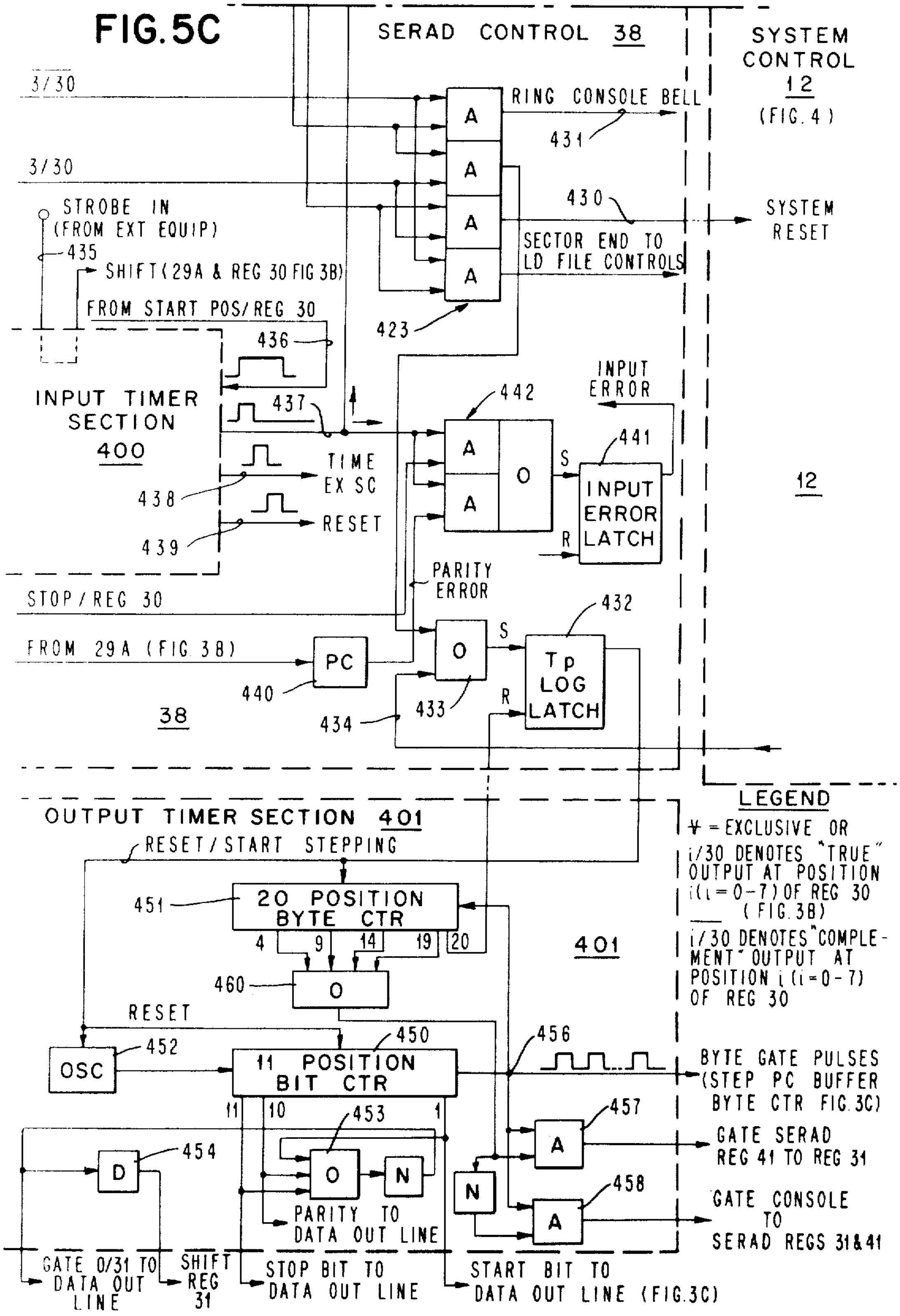

As shown in FIGS. 5A–5C SERAD control section 38 includes various latches and (as shown in FIG. 5C) timer circuitry 400, 401 for its input (receive) and output (transmit) functions. In receiving operations appearance of a signal (1-bit) in the start position of SERAD input register 30 conditions And-gates 402–404 (FIG. 5A) one of which produces an output signal depending upon states of DATA MODE latch 405 and bit position 7 of SERAD input register 30.

An output from gate 402 denotes the presence of a SERAD command in register 30. An output from gate 403 denotes the presence of non-command information in register 30 and causes transfer of such to SERAD register (FIG. 3B). Such transfers are followed by advancement of byte counter 406, FIG. 3B. An output from gate 404 is sent to the system control section as a signal to transfer the content of register 30 through the system E-Switch to system registers and storage (via an "X-Bus to Storage" path).

Commands (gate 402, energized to Command Decode condition) are decoded to produce the various operations. Gates 408 (commands of the form 00xxxxx) select positions of group switch logic 33, in system control section 12 (FIG. 4) for transfers from SERAD register 32 (FIG. 3B) to sections of system control register 55 (ROSDR).

The select lines connected to the system LSI package 409 (FIG. 5A) control switching of groups of 21 or fewer bits from diagnostic register 32 to one of four sections of ROSDR. (If desired, decoding gates 408 may also be spatially integrated with the group switch 33 at 409. Then only three are needed for controlling transfer connections between control sections 38 and 12; one from gate 410 and two from bit positions 2 and 3 of register 30, assuming provision of complement gates at 409.)

Gates 410 and 411 (EX SC commands) control gates in Exclusive-or comparators 412 and 413 which compare the A, B outputs of system branch control logic 57, 58 with respective bits 5 and 6 in register 30. A mismatch in either comparison sets A, B Compare Error Latch 414 (FIG. 5B).

Gates 415 (FIG. 5A), viewed top to bottom are energized respectively by SERAD commands, 0111xxx, 0110xxx, 0101xxx, and 0100xxx. The uppermost gate, when operated, forces a channel error through the system controls. A signal from the next lower gate in group 415, subject to conditioning of a Rate Switch 416, transfers signals from console switches to LD file addressing controls and causes repetition of an LD file sequence. The next gate controls resetting of a SERAD mode latch 417 (FIG. 5B) to ENTER ROS MODE condition, which induces the system and its clocks to resume automatic operation from the stopped condition. The last gate conditions other gates 418, 419 (FIG. 5B) to produce one of three functions: Repeat cycle system (step system clocks until next command decode, block ROS to ROSDR path), transfer SERAD register 32 to encoder input to console register 320, start log status operation of Console.

The repeat cycle operation causes the system to repeatedly execute the function designated by an unchanging ROSDR microinstruction. The console register transfer operation causes the console to operate as if in response to manual control elements on its panel (Manual Simulate), and is useful to test the console unit. The log status operation initiates cycling of console clocks and counters. This causes the console to operate its serializer net (integrated in the system circuit package) to scan system component status into the console store in a predetermined sequence.

Part of the mechanism which allows the "fourth option" (testing the CPU at CPU speed) referred to above is shown in FIG. 5B. An overflow of counter 94 (FIG. 4) produces a signal on line 95 which is fed, through OR circuit 97, to line 96 which is used to stop the system clocks 78 (FIG. 4). The signal on line 95 will also be used to set a status latch 98. The output of this latch may be used to stop the system entirely or to take other appropriate action. If the CPU test has proceeded normally, it will have reached a predetermined point before enough time has expired for the counter to overflow. The fact that the test has reached this point will be signalled by a particular format of a DIAGNOSE instruction (described further below with respect to FIG. 6) which will cause a signal to be furnished to OR circuit 97 via line 100 from the system control 12. Line 100 may also be used to set another status latch 99. Latch 99, being set, provides a signal which indicates that the test was completed. (Status latches 98 and 99 may be reset, for example, by the output of the third AND circuit 415 (FIG. 5A) which is used to reset the SERAD mode latch 417.) The signal on line 96, in addition to stopping the system clocks, is used to set SERAD mode latch 417 so that SERAD may regain complete control of the system.

Groups of gates 420, 421, 422, (FIG. 5A) and 423 (FIG. 5C) operate to decode other commands which are used to: (1) set log test latch 425 (FIG. 5B); (2) reset log test latch 425 after operating the seven exclusive-or comparators 426 to compare a selected byte of SERAD diagnostic register information (one selected by the last three xxx bits of the command) with a corresponding byte of console register information and set a compare error latch 427 when a comparison mismatch is sensed; (3) compare selected single bits, in particlar diagnostic and console register bytes, in exclusive-or circuit 428; (4) signal the console that an end of an LD file record section (SECTOR END) has been reached; (5) reset the system (indicated at 430 FIG. 5C); (6) RING the audible alarm bell in the console unit (indicated at 431); and (7) start a log transmit operation by setting TP log latch 432 (or-circuit 433 permits this latch to be set either by the 1101xxx SERAD command or a system signal at 434 derived from system controls).

In receiving operations, strobe impulses (line 435) defining mid-points of information bits coincidentally transmitted from external equipment, are converted into sampling and shift impulses. The shift impulses are used to shift SERAD input register 30 and the sampling impulses are used to gate the information at 29A (FIG. 3B) into the lowest (STOP) position of register 30.

When a start bit (=1) appears in the highest (START) position of the initially reset (all 0's) register 30 timer section 400 is activated (line 436) to produce progressively delayed control pulses as at 437, 438 and 439.

Pulse 437 is used to conditionally transfer parity (PC circuit 440) and/or Stop bit status of register 30 into Input Error Latch 441 through logic 442. An error condition is set in this operation when a parity check error is present or the Stop bit is invalid (i.e., =1). Pulse 437 is also used to partly condition gate 403 for the register 30 to register 32 control operation.

Pulse 438 is used to time execution of the EX SS (Execute Single Step) control function of gate 411 and to time advancement of byte counter 406 (FIG. 3B) after a register 30 to register 32 transfer.

Pulse 439 is used to time resetting of register 30 after the information therein has either been decoded (Command Decode) or transferred (to register 32 or through system E-switch). The same pulse is used to reset byte counter 406, FIG. 3B, after Command Decode operations.

Output functions (TP Log Latch Set) are timed by timer section 401. An 11-position bit counter 450 and a 20-position byte counter 451 are reset to initial states and a bit oscillator 452 is started (or gated). Counter 450 times gating of bits from position 0 of register 31 to the Data Out line (FIG. 3B) and gating of Start (=1), Stop (=0) and Parity (=bit furnished by PC circuit 42, FIG. 3B) bit conditions to the same line. Start, Stop and parity are gated in respective first, 10th and 11th intervals of the byte transmission cycle. In the other intervals of each cycle, distinguished by circuits 453, data at position 0 of register 31 is gated to the Data Out line and after a delay D (454) the register is left-shifted.

For each byte (11-bits) transmitted a byte impulse produced at 456 advances byte counter 451 and conditions gates 457, 458 for intermediate gating functions. Gate 458 is operated when a byte is required to be transferred from the console unit to SERAD registers 31 and 41. Gate 457 is operated when a byte of segregated console parity check information, assembled in SERAD register 41, is required to be transferred into SERAD register 31.

Gate 458 is operated at fourth, ninth, 14th and 19th byte gate pulse intervals of each 20 byte TP log transmission sequence (note Or gate 460 and reset of TP log latch 432 at 20th stage of counter 451). This interlaces four segregated parity bytes with the 16 related console bytes at respective fifth, 10th, 15th and 20th positions of the TP log sequence.

Each byte gate impulse at 456 advances four-position byte counter 462 FIG. 3C controlling placement of console parity information bit pairs into register 41, FIG. 3C, whereby a full byte of eight parity information bits is assembled in buffer 41 for each four byte units of other console information transferred to register 31. Alternatively, the outputs of counter 451 may be logically gated to control the input gating to buffer 41.

Figure 6:
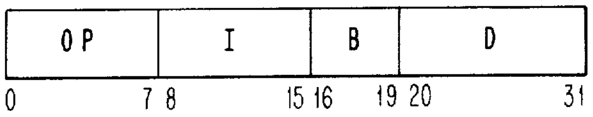
FIG. 6 shows a preferred format of a DIAGNOSE instruction that may be used in conjunction with the improved adapter.

Referring to FIG. 6, a preferred format of a DIAGNOSE instruction is shown. Since implementation of a DIAGNOSE instruction is almost totally dependent upon the particular machine wherein it is used, complete details will not be give herein. Additional details are available, for example, in U.S. Pat. No. 3,325,788. In the preferred embodiment of this invention a DIAGNOSE instruction at the end of a CPU test is used to return system control to SERAD. In operation, after the DIAGNOSE instruction is decoded, a register (B) provides a base address to which a displacement (D) is added to provide the address in storage of a control word which specifies the starting address of a particular microprogram. The control word is read from storage into a console register and, via line 66 (FIG. 4) through selector 65 and switch 62, into CURRENT ROAR 63. The control word will pass through address generator 56 into CPU ROAR 76 to cause a branch to the microprogram which returns control to SERAD for analysis of test results and initialization for the next test.

Figure 7:
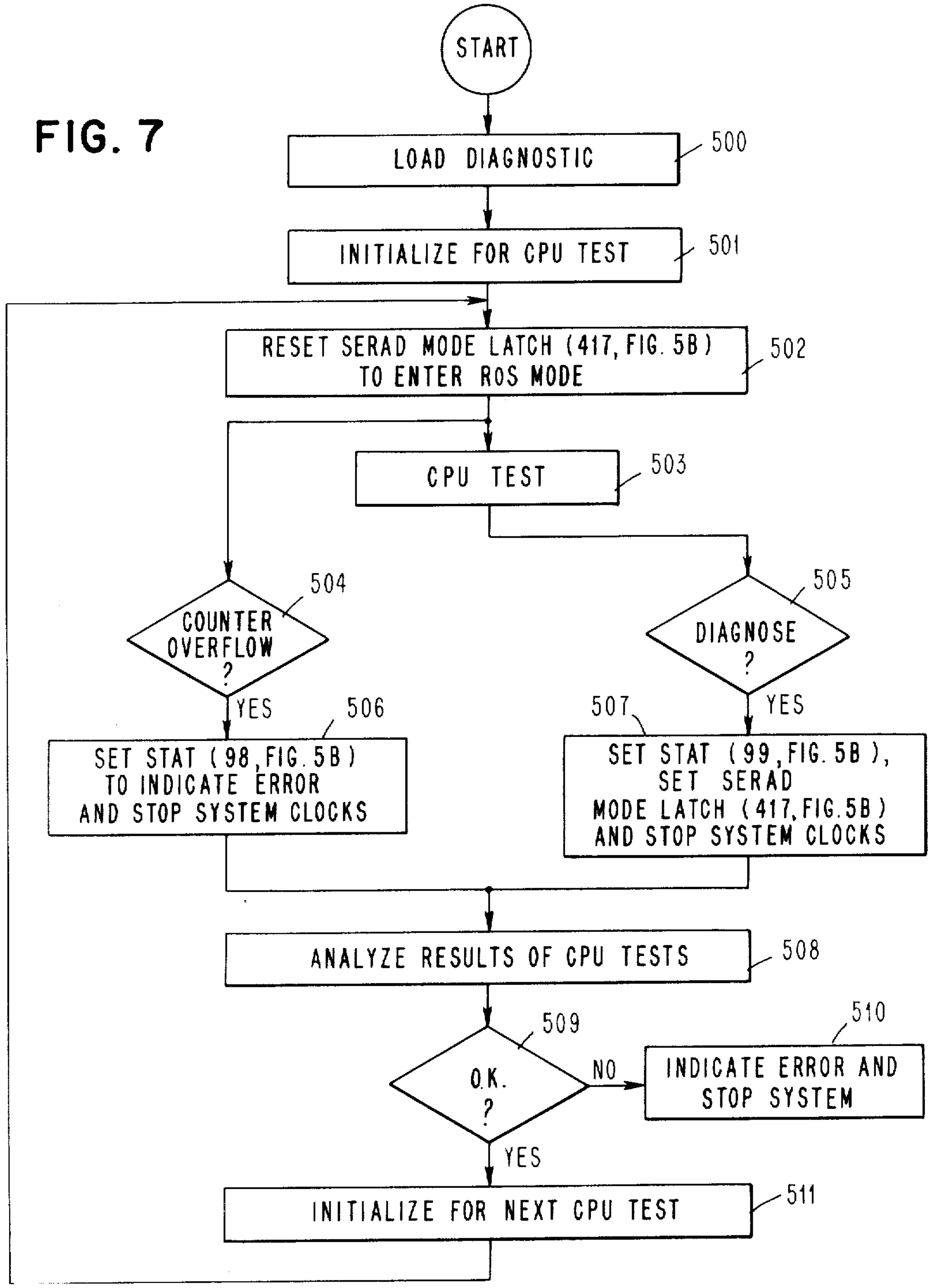
FIG. 7 is a flow chart illustrating a manner in which the improved adapter may be used in testing a system.

FIG. 7 illustrates, in flow chart form, the manner in which diagnostic testing may be performed with the improved SERAD. As indicated in block 500, the first step is to load diagnostic programs into the system from, for example, a local disk file 26 (FIG. 1). This will generally be done under SERAD control. Then, still under SERAD control, the CPU is initialized for the first test (block 501) by using SERAD to set various elements of the host system (as well as counter 94 shown in FIG. 4 and control words which are accessed via the DIAGNOSE instruction) to predetermined initial conditions. Next, the SERAD mode latch 417 (FIG. 5B) is reset to allow the system to enter ROS mode (block 502). In ROS mode, the CPU is tested at its normal operating speed (503) until either a counter overflow (504) or a particular format of DIAGNOSE instruction (block 505) is sensed. Detection of a counter overflow will result in setting status latch 98 (FIG. 5B). (The counter monitors the system test and, if the counter overflows, terminates the test after enough time has expired so that the test should have been completed.) If the CPU test has run to completion, detection of the appropriate DIAGNOSE instruction (block 505) will produce a signal which is used to set an appropriate status latch, set the SERAD mode latch, stop the system clocks (block 507) and return the system to SERAD control. SERAD will then analyze the results of the CPU test (block 508) and, if the results are not correct (block 509), will indicate the presence of an error (either counter overflow or incorrect test results) and terminate the test (block 510). If the results of the test are correct, SERAD will initialize the system for the next CPU test (block 511) and repeat the portion of the above sequence which began at block 502.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system which includes an externally controllable adapter unit comprising means connected to other parts of the system for providing test initialization data thereto while the main system clocks are in a disabled condition; improved means for system diagnosis comprising:

means for enabling said main system clocks, thereby putting said system into a state in which it can be utilized to perform a diagnostic test utilizing said test initialization data;

completion means for sensing the completion of said diagnostic test and producing a first signal to indicate that said diagnostic test has been concluded;

timing means, operative when said main system clocks are enabled, for producing a second signal if said system clocks remain enabled for a predetermined period of time; and means responsive to said first signal or said second signal for disabling said main system clocks, thereby putting said system into a state in which the results of said diagnostic test may be analyzed through said adapter unit.

2. The improved means for system diagnosis of claim 1 wherein said timing means comprises:

a counter which includes overflow signalling means; and means connecting said counter to said main system clocks for causing said counter to be incremented in response to clock signals;

said overflow signalling means, upon an arithmetic overflow of said counter, producing said second signal.

3. In a data processing system including system controls; said controls including a storage matrix for producing microinstruction control signals, an output register coupled to said matrix for holding a microinstruction signal for controlling system gates for one cycle of system operation, an address register coupled to said output register and to other elements of said system for selecting successive microinstruction signals from random positions in said matrix, and a source of clock pulses for defining the cycles of operation of said system; an improved test adapter for connecting external test means to said system for testing said system, said adapter comprising:

transfer means responsive to signals from said external test means to transfer test initialization signals to said output register;

blocking means operative concurrently with said transfer means for blocking said source of clock impulses thereby disabling said system and for blocking the coupling between said matrix and said output register;

means operative subsequent to said transfer of test initialization signals to deactivate said blocking means, thereby enabling said source of clock pulses and restoring the coupling between said matrix and said output register;

thereby putting said system into a state in which it can be utilized to execute a sequence of microinstructions the first of which is determined by said test initialization signals and the second of which is located in said matrix at an address defined at least in part by said test initialization signals;

completion detecting means responsive to the presence in said output register of a microinstruction of a predetermined format for producing a first signal to indicate that said sequence has been concluded;

timing means, operative when said blocking means is deactivated, for producing a second signal after the expiration of a predetermined time period following the start of said sequence if said blocking means remains deactivated throughout said time period; and means responsive to either said first signal or said second signal to activate said blocking means, thereby disabling said system and putting it into a state in which the results of execution of said sequence may be analyzed.

4. The improved test adapter of claim 3 wherein said timing means comprises:

a counter;

connecting means connecting said source of clock impulses to said counter for causing said counter to count clock impulses; and time sensing means connected to said counter for causing said second signal to be produced after a predetermined number of clock impulses have been counter by said counter.

5. The improved test adapter of claim 4 further comprising:

means for initializing said counter with a predetermined initial count prior to execution of said sequence;

means for causing said counter to be incremented in response to clock impulses received via said connecting means; and overflow means within said counter for indicating a counter overflow condition;

said overflow means being connected to said time sensing means for causing said second signal to be produced.

6. The improved test adapter of claim 4 further comprising:

means for initializing said counter with a predetermined initial count prior to execution of said sequence;

means for causing said counter to be decremented in response to clock impulses received via said connecting means; and underflow means within said counter for indicating a counter underflow condition;

said underflow means being connected to said time sensing means for causing said second signal to be produced.

7. In a data processing system including system controls; said controls including sequence means for producing instruction control signals, an output means coupled to said sequence means for holding an instruction control signal for controlling system gates for one cycle of system operation, means for selecting successive instruction control signals from said sequence means, and a source of clock impulses for defining the cycles of operation of said system; an improved test adapter for connecting external test means to said system for testing said system, said adapter comprising:

transfer means responsive to signals from said external test means to transfer test initialization signals to said system controls;

blocking means operative concurrently with said transfer means for blocking said source of clock impulses thereby disabling said system;

means operative subsequent to said transfer of test initialization signals to deactivate said blocking means, thereby enabling said source of clock pulses and putting said system into a state in which it can be utilized to execute a sequence of instruction control signals which starts at an address in said sequence means determined by said test initialization signals;

completion detecting means responsive to the presence in said output means of an instruction control signal of a predetermined format for producing a first signal to indicate that said sequence has been concluded;

timing means, operative when said blocking means is deactivated, for producing a second signal after the expiration of a predetermined time period following the start of said sequence if said blocking means remains deactivated throughout said time period; and means responsive to either said first signal or said second signal to activate said blocking means, thereby disabling said system and putting it into a state in which the results of execution of said sequence may be analyzed.

8. The improved test adapter of claim 7 wherein said timing means comprises:

a counter;

connecting means connecting said source of clock impulses to said counter for causing said counter to count clock impulses; and time sensing means connected to said counter for causing said second signal to be produced after a predetermined number of clock impulses have been counted by said counter.

* * * * *